United States Patent [19]

Dougherty et al.

[11] 4,258,422
[45] Mar. 24, 1981

[54] LIQUID GAGING SYSTEM

[75] Inventors: William R. Dougherty, St. Anthony; Martin J. van Dyke, Brooklyn Park; Dwight D. Colby, Roseville, all of Minn.

[73] Assignee: Honeywell Inc., Minneapolis, Minn.

[21] Appl. No.: 36,119

[22] Filed: May 4, 1979

[51] Int. Cl.³ .............................................. G01F 23/26
[52] U.S. Cl. ................................. 364/442; 364/424; 364/509; 73/304 C
[58] Field of Search ............... 364/442, 424, 509, 550, 364/551, 560, 564; 324/61 R, 61 P, 60 C; 73/304 C, 313, 291, 290 R; 318/642; 340/603, 612, 618, 620

[56] References Cited

U.S. PATENT DOCUMENTS

| | | | |
|---|---|---|---|
| 3,361,897 | 1/1968 | Rush | 364/442 |
| 3,463,980 | 8/1969 | Cohn et al. | 318/642 |
| 3,523,186 | 8/1970 | Cohn et al. | 73/290 R |
| 3,830,090 | 8/1974 | Hersch et al. | 73/304 C |
| 3,935,741 | 2/1976 | Zinsmeyer et al. | 73/313 |
| 4,083,248 | 4/1978 | Maier | 73/304 C |
| 4,090,408 | 5/1978 | Hedrick | 73/304 C |
| 4,173,893 | 11/1979 | Hedrick | 73/304 C |
| 4,181,958 | 1/1980 | Juengel et al. | 364/560 |

Primary Examiner—Charles E. Atkinson
Assistant Examiner—Gary Chin
Attorney, Agent, or Firm—John P. Sumner

[57] ABSTRACT

A liquid gaging system including a probe for mounting in a tank. A probe for a particular tank produces a length signal dependent upon the length of the probe being immersed in liquid. The system also includes a storage apparatus for storing characterization parameters and a determining apparatus for determining liquid volume in the particular tank based on the length signal and the characterization parameters. In addition, the system includes an apparatus for connecting the storage apparatus to the determining apparatus and an apparatus for connecting the probe to the determining apparatus.

32 Claims, 11 Drawing Figures

LIQUID GAGING SYSTEM

BACKGROUND OF THE INVENTION

The present invention relates to a system for measuring the liquid volume or quantity in one or more tanks. The overall system is microcomputer-controlled and provides a readout of liquid or fuel volume or quantity.

A basic sensor for measuring fuel volume or quantity continues to be the capacitance sensor which has been accepted in the aircraft industry for many years as a rugged, reliable device. In the present invention, significant improvement in sensor gaging accuracy is obtained by use of a microcomputer to provide tank shape, tank or aircraft attitude, and similar characterization which was formerly only approximated by means of physically characterized (shaped) fuel gage probes.

In this manner, the present invention provides a number of advantages over conventional fuel gaging systems. These include the need for a fewer number of fuel gage probes in each tank, simplified probe construction by elimination of physical characterization, improved system accuracy by characterizing for tank geometry and tank or airplane attitude in the microcomputer, reduced system weight by decreasing the number of fuel gage probes, and simplified installation for the aircraft manufacturer by requiring fewer tank units. In addition, as further explained below, indicators are pre-calibrated, thus reducing installation costs and replacement time, and common apparatus may be used for all primary and repeater indicators, thereby reducing spares costs and simplifying logistics. Compatibility with solid state indicator design also provides potential for improved system accuracy. Further, compatibility with high frequency fuel gage probe excitation provides means for reduced contamination and water problems. Lastly, computer characterization provides a more flexible design which can accommodate fuel tank changes with minor hardware impacts.

SUMMARY OF THE INVENTION

The present invention is a liquid gaging system including a probe for mounting in a tank. A probe for a particular tank produces a length signal dependent upon the length of the probe being immersed in liquid. The system also includes a storage apparatus for storing characterization parameters and a determining apparatus for determining liquid volume in the particular tank based on the length signal and the characterization parameters. In addition, the system includes an apparatus for connecting the storage apparatus to the determining apparatus and an apparatus for connecting the probe to the determining apparatus.

DESCRIPTION OF THE PREFERRED EMBODIMENT

Figure 1:
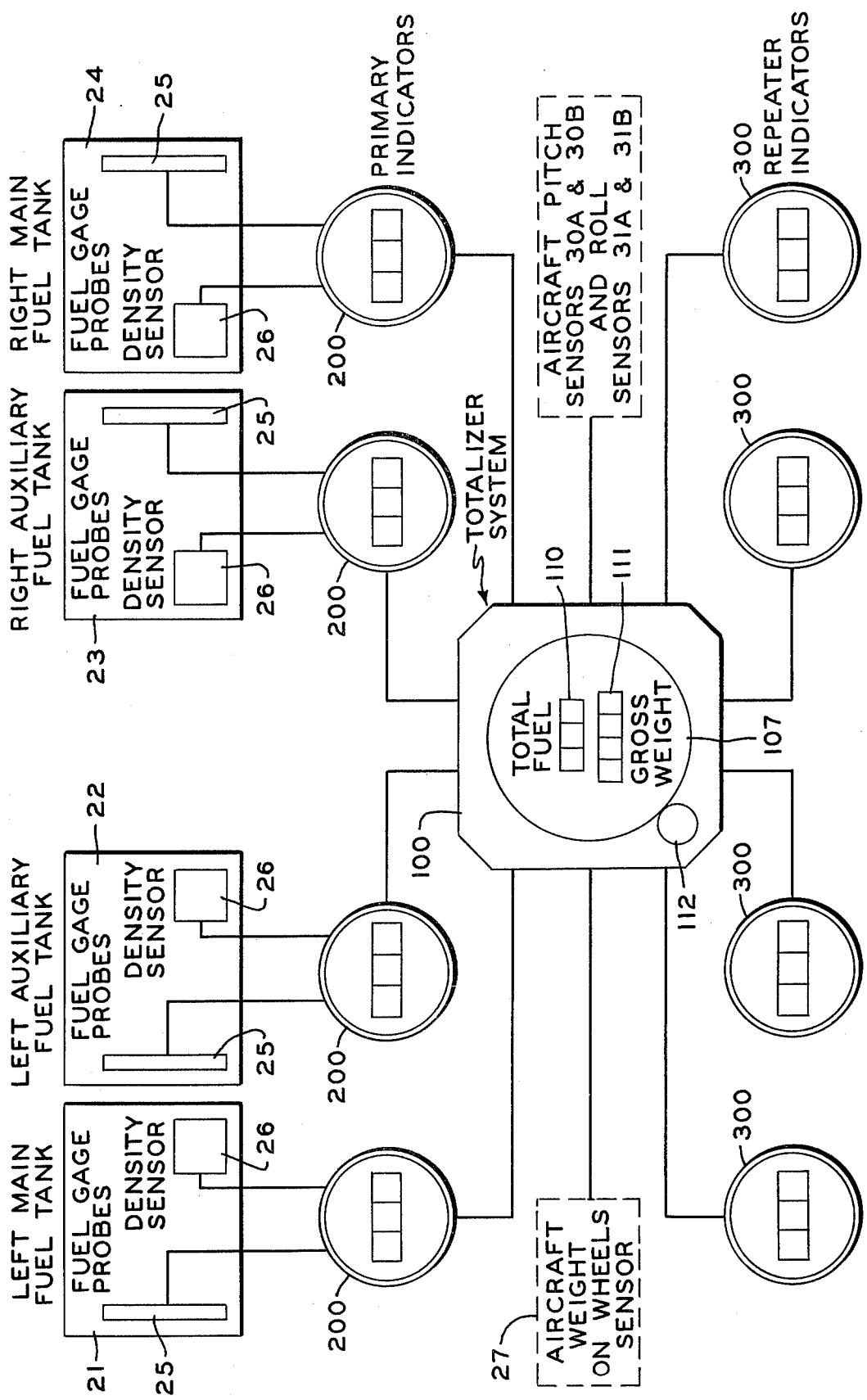
FIG. 1 is a functional system diagram of an embodiment of the present invention.

Referring to the functional diagram of FIG. 1, an embodiment of the present invention is functionally illustrated in an aircraft system having four tanks or fuel tanks (hereinafter typically fuel tanks); namely, a left main fuel tank 21, a left auxiliary fuel tank 22, a right auxiliary fuel tank 23, and a right main fuel tank 24. Within each fuel tank are one or more liquid or fuel gage probes 25 (hereinafter typically fuel gage probes 25) and a density sensor 26. Each fuel tank has its own primary indicator 200 and repeater indicator 300. Each primary indicator is interconnected between fuel gage probes 25 and density sensor 26 in its respective tank as well as with a totalizer system 100 which is typically located in the aircraft cockpit. In an aircraft system, each primary indicator 200 is located in the cockpit. Repeater indicators 300 are also interconnected with the totalizer system 100. In an aircraft system, repeater indicators 300 are located at a refueling station.

An aircraft weight on wheels sensor 27 is also interconnected with totalizer system 100 in order to communicate to totalizer system 100 whether or not the aircraft is on the ground or in the air. Aircraft pitch sensors 30A and 30B and roll sensors 31A and 31B are also interconnected with totalizer system 100.

Figure 2:
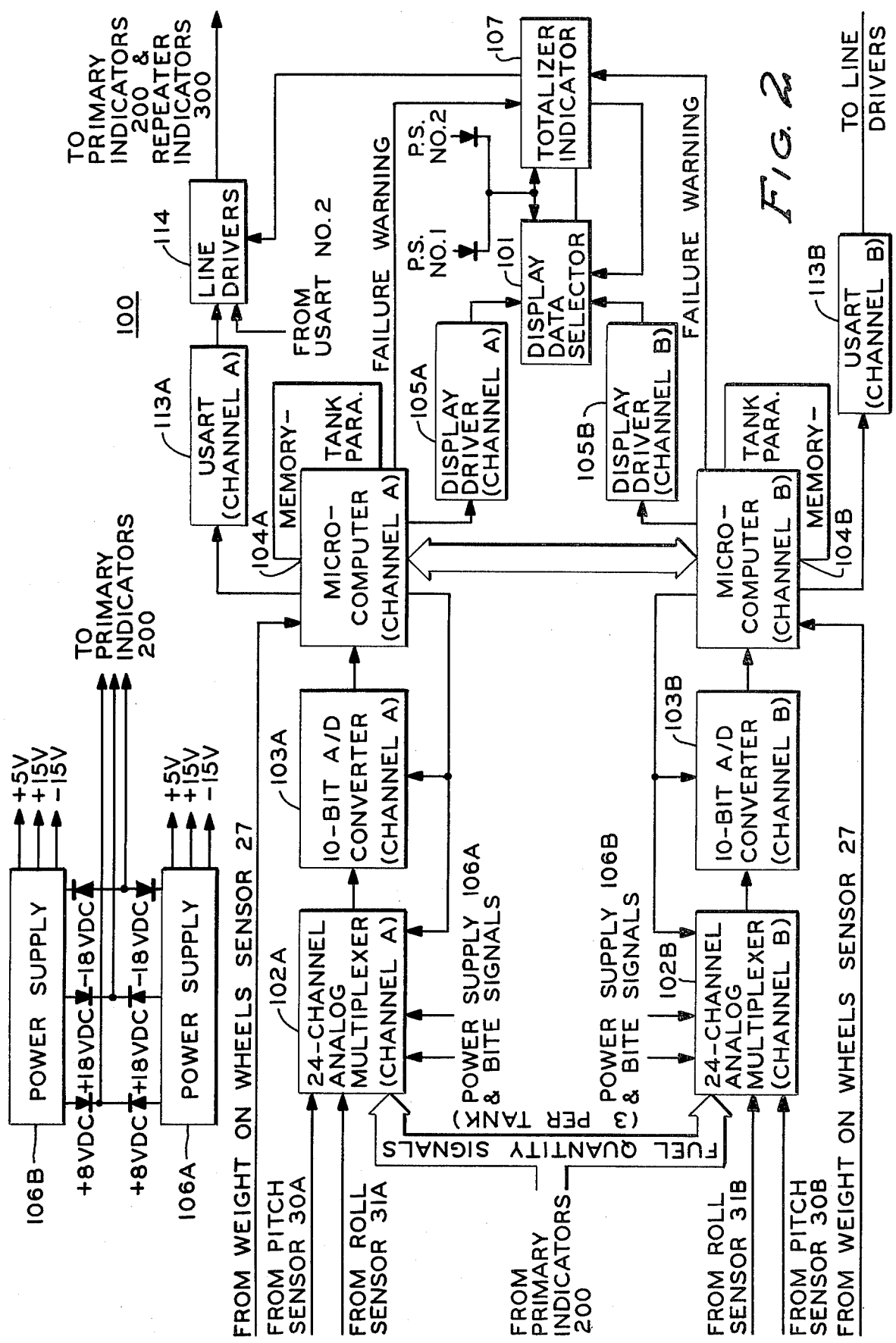
FIG. 2 is a totalizer system block diagram of an embodiment of the present invention functionally represented in FIG. 1.

FIG. 2 is a diagram of a typical embodiment of totalizer system 100 indicated in FIG. 1. Totalizer system 100 as shown in FIG. 2 has two independent channels, A and B, of data processing, each channel extending from the analog inputs shown on the left of FIG. 2 to a totalizer indicator 107 shown on the right of FIG. 2. Channel A comprises a 24-channel analog multiplexer 102A which is connected to a 10-bit A/D converter 103A. Channel A also includes a microcomputer 104A (providing a storage means and a determining means) which is interconnected to both A/D converter 103A and multiplexer 102A as well as to a display driver 105A and to a Universal Synchronous Asynchronous Receiver Transmitter (USART) 113A. Channel B of the embodiment shown comprises components virtually identical to channel A including a 24-channel analog multiplexer 102B, a 10-bit A/D converter 103B, a microcomputer 104B (also providing a storage means and a determining means), a display driver 105B, and a USART 113B, these components being interconnected in the same manner as in channel A. The outputs of both display drivers 105A and 105B are interconnected to a data display indicator 101, which in turn is connected to totalizer indicator 107.

Typically, both channels A and B operate concurrently. As will be further explained below, each microcomputer 104A and 104B computes the fuel volume and quantity remaining in each individual fuel tank (21, 22, 23, and 24) and transmits the results via its USART (113A or 113B) to line drivers 114. A panel switch in the aircraft cockpit may be used to select which of the line drivers 114 is enabled. As will be further discussed below, a serial output of line drivers 114 is connected to the digital logic of each individual fuel tank primary indicator 200 and repeater indicator 300.

In addition to calculating the fuel volume or quantity remaining in each fuel tank, each microcomputer 104A and 104B also calculates total fuel volume or quantity and gross aircraft weight, and the results are given to corresponding display driver 105A or 105B. A switch may also be used to select whether display driver 105A or 105B will drive totalizer indicator 107.

By way of connections from primary indicators 200, each multiplexer 102A and 102B receives three signals corresponding to each fuel tank 21, 22, 23, and 24. These signals are a length signal or total wetted sensor length signal of the fuel gage probes 25 in the tank, a signal from density sensor 26 in the tank, and a reference signal.

In addition, multiplexer 102A receives signals by connection to aircraft pitch sensor 30A, aircraft roll sensor 31A, and power supply 106A.

Multiplexer 102B also receives signals by connection to aircraft roll sensor 30B, aircraft pitch sensor 31B, and power supply 106B.

Both multiplexers 102A and 102B also receive BITE signals which are used for testing the integrity of the overall system.

Ten-bit A/D converters 103A and 103B are used to convert the analog signals coming through multiplexer 102A and 102B to digital signals for use by microcomputers 104A and 104B. Operation of A/D converters 103A and 103B is controlled by microcomputers 104A and 104B, respectively.

Each microcomputer includes a microprocessor, a read only memory (ROM), and a random access memory (RAM). Within a channel of data processing, the microprocessor within the microcomputer (104A or 104B) controls data flow by selecting data coming through its respective multiplexer (102A or 102B) and A/D converter (103A or 103B). The microprocessor also controls display of data by selecting the proper data to be sent to display driver 105A or 105B in the channel. The ROM stores an operating program as well as lookup tables used in fuel volume calculations. The RAM stores temporary values used in fuel volume and weight calculation processes. Each microcomputer (104A or 104B) uses the signal received from weight on wheel sensor 27 to determine whether the aircraft is on the ground or in the air and, therefore, whether flight data tables or ground data tables are to be used.

Fuel quantity remaining in each fuel tank is displayed on the corresponding primary indicator 200 and repeater indicator 300. Total fuel quantity remaining on the aircraft is displayed on digital readout 110 (FIG. 1) within totalizer indicator 107. Gross weight of the aircraft is indicated on digital readout 111 (FIG. 1) within totalizer indicator 107. Provision for manual set-in of aircraft zero fuel weight is provided by means of a set knob 112 (FIG. 1) in the proximity of totalizer indicator 107. (Set knob 112 positions a wiper of a potentiometer in order to provide a signal which, although not shown by FIG. 2, is received by multiplexers 102A and 102B and is ultimately converted to a digital form and summed with the total fuel quantity signal to obtain gross aircraft weight.)

In addition to fuel quantity computation, each microcomputer 104A and 104B performs a built-in-test (BITE) function. Both microcomputers 104A and 104B perform memory sum checks on ROM and read/write verification of every bit in RAM. During the BITE sequence, a sample problem is computed and the result compared to an expected value. A/D converters 103A and 103B are checked for conversion accuracy at both plus and minus full scale inputs. Display drivers 105A and 105B are read to see if the value they are supposed to have is, in fact, the value they hold. Power supplies 106A and 106B are checked via their corresponding multiplexer (102A or 102B) and A/D converter (103A and 103B). Multiplexers 102A and 102B are not individually checked. However, the multiplexer-A/D chain output values are monitored for reasonableness. If any of the above checks uncovers a failure, software in the appropriate microcomputer (104A or 104B) raises a serial output data line in the microcomputer to a logical "1" and turns on an indicator for a failure warning.

Assuming neither microcomputer 104A or 104B detects a failure, input data values and/or computed results may be passed between them for comparison. In such a case, if a difference in value exists and neither microcomputer 104A or 104B has discovered an error in its data path, it is possible to have both microcomputers 104A and 104B turn on failure warning indicators in totalizer indicator 107.

Multiplexers 102A and 102B may comprise National Semiconductor 11202 analog switches. A/D converters 103A and 103B are standard components recognized by those skilled in the art. Microcomputers 104A and 104B may comprise Intel 8085A's and memory elements such as Intel 8155 RAM's and Intel 2716 EPROM's. USART's 113A and 113B may be Intel 8251A's. Line drivers 114 may comprise a 9614 dual line driver chip. Display drivers 105A and 105B may each comprise an Intel 8279 Programmable Keyboard/Display Interface. Display data selector 101 may comprise a 54LS257 type of multiplexer.

A model was built comprising a single channel of totalizer 100. For that model, an analog multiplexer (102A or 102B) and an A/D converter (103A or 103B) were implemented using an Intel SBC 732 A/D-D/A converter board. An Intel SBC 80/05 single board computer was used. This single board computer included the previously mentioned Intel 8085A microcomputer including 8155 and 2716 memory elements. These components and a display driver (105A or 105B) and display data selector 101 were interfaced via an Intel Multibus specified in an Intel Manual 9800683. The display driver (105A or 105B) and display data selector 101 were built on an Intel SBC 905 prototyping board. The display consisted of ten REFAC Electronics Corporation Pinlite displays Model No. DIP-641R. A three-digit display was used to display pounds or gallons or density. The type of display was switch selectable. Pitch attitude consisted of a three-digit display with a fourth digit for a minus sign. Roll attitude consisted of a two-digit display with a third digit for a minus sign. The display was implemented by way of REFAC Engineering Bulletin No. 3 on multiplex operation.

PRIMARY AND REPEATER INDICATORS-DIGITAL SECTION

Figure 3:
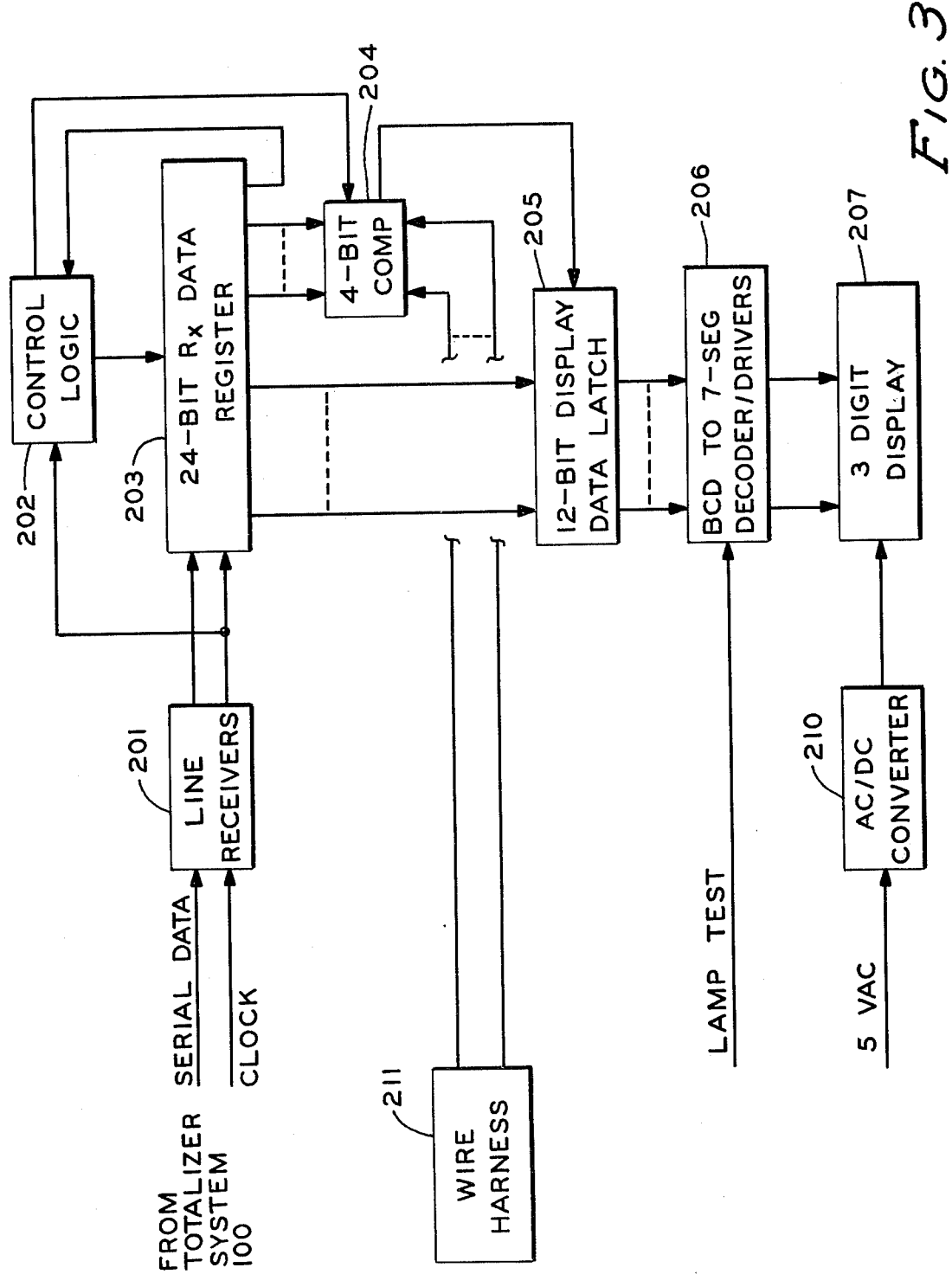
FIG. 3 illustrates an embodiment of digital logic for primary and repeater indicators.

The digital logic in primary indicators 200 and repeater indicators 300 is typically identical and is illustrated in FIG. 3. This digital logic comprises line receivers 201 interconnected with a control logic circuit 202 and a 24-bit data register 203 which in turn is interconnected with control logic 202, a 4-bit comparator 204, and a 12-bit display data latch 205. Four-bit comparator 204 is also interconnected with 12-bit display data latch 205 and a wire harness 211. Data latch 205 is interconnected to a BCD to seven-segment decoder/driver 206 which in turn is coupled to a three-digit display 207. An AC/DC converter 210 is also coupled to three-digit display 207.

In operation, line receivers 201 bring in serial data from totalizer system 100 and a data clock also transmitted by totalizer system 100 from a microcomputer (104A or 104B) through a USART (113A or 113B) and line drivers 114. The leading edge of the first clock signal in a data transmission is used by control logic 202 to enable 24-bit register 203. Each successive data bit is then clocked in on the falling edge of the data clock.

The first bit in every data transmission is always a "1." When the twenty-fourth bit in data register 203 goes to a "1," the message for the particular data transmission is complete. This twenty-fourth bit going to a "1" fires the first half of a dual one-shot in control logic circuit 202. The output pulse width of this one-shot is "ANDed" with an output state of 4-bit comparator 204.

Comparator 204 has two 4-bit inputs. One of these inputs is connected to wire harness 211 in order to provide a code that specifies which fuel tank data the indicator should display. For each indicator, this code is wired into the wire harness 211 at the back of the indicator itself. The other input to 4-bit comparator 204 is interconnected with data register 203 for the purpose of receiving a 4-bit code from data register 203 and specifying the fuel tank to which the data portion of a message pertains. Thus, if the message code and the wire harness code are the same, an output of comparator 204 will indicate that the data is meant for a particular primary indicator 200 and repeater 300 corresponding to a particular fuel tank. The "ANDed" output of the one-shot in control logic circuit 202 and comparator 204 will then clock the data portion of the message from data register 203 to 12-bit display data latch 205. If the comparator 204 input codes do not agree, display data latch 205 remains unchanged.

In either case, when the first half of the one-shot in control logic 202 "times out," the second half of the one-shot is fired. The output of the second half of the one-shot is used to disable and clear data register 203 which in this manner is continuously cleared until the leading edge of the data clock in the next transmission sequence is detected.

Display data latch 205 drives three BCD to seven-segment decoder drivers 206 which in turn drive three incandescent seven-segment displays in three-digit display 207. Display brightness in display 207 is controlled by a five-volt AC input to AC/DC converter 210 which in turn is coupled to display 207. AC/DC converter 207 is a simple transformer, diode bridge, and filter which produces a DC output proportional to the AC input.

A lamp test input is provided to decoder/driver 206 in order to allow an external switch to light all segments in display 207.

In the construction of the digital logic in primary indicators 200 and repeater indicators 300, line receivers 201 may comprise National Semiconductor 78C20's. Control logic circuit 202 comprises a Motorola CMOS 14528 dual one-shot and a CMOS 4027 flip-flop. Twenty-four bit register 203 may comprise three CMOS 4015 registers. Four-bit comparator 204 may be a Motorola CMOS 14585. Twelve-bit display data latch 205 may be two 54LS174 hexadecimal data latches. BCD to seven-segment decoder/driver 206 may comprise a 5446A.

PRIMARY INDICATOR ANALOG CIRCUITRY

Figure 4:
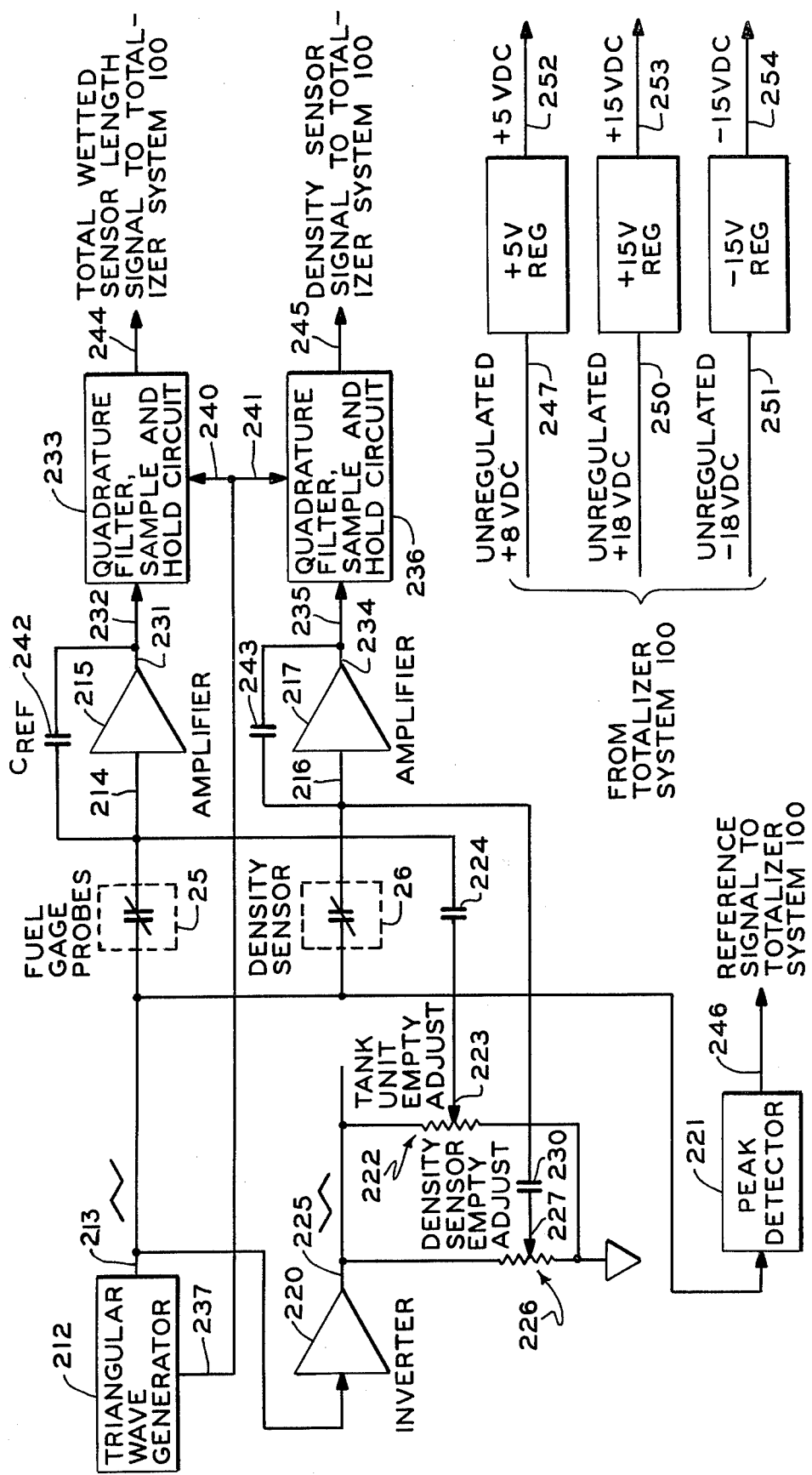
FIG. 4 illustrates an embodiment of primary indicator analog circuitry.

In addition to containing the digital electronics previously discussed and shown in FIG. 3, primary indicators 200 each contain the analog circuitry shown in FIG. 4. Thus, since there is one primary indicator for each fuel tank 21, 22, 23, and 24, there is a set of the analog circuitry shown in FIG. 4 for each fuel tank 21, 22, 23, and 24.

Each set of circuitry shown in FIG. 4 provides excitation signals to fuel gage probes 25 and density sensor 26 in the corresponding fuel tank. In addition, each circuit provides three signals to totalizer system 100. As previously mentioned, these signals are a total wetted sensor length signal, a density sensor signal, and a reference signal.

For each analog circuit, the total capacitance of fuel gage probes 25 in a particular tank is connected between an output 213 to a wave generator 212 and an input 214 to a bridge amplifier 215. Similarly, the capacitance of density sensor 26 is connected between output 213 of wave generator 212 and an input 216 of a bridge amplifier 217. Output 213 of wave generator 212 is also connected to an input of an inverter 220 and to an input of a peak detector 221.

An output 225 of inverter 220 is connected to the high side of a potentiometer 222, a wiper 223 of which is connected across a capacitor 224 to input 214 of amplifier 215. Similarly, output 225 of inverter 220 is connected to the high side of potentiometer 226, a wiper 227 of which is connected across a capacitor 230 to input 216 of amplifier 217.

An output 231 of amplifier 215 is connected to an input 232 of a quadrature filter, sample and hold circuit 233. In a similar manner, an output 234 of amplifier 217 is connected to an input 235 of a quadrature filter, sample and hold circuit 236.

Wave generator 212 also has an output 237 connected to an input 240 of quadrature filter, sample and hold circuit 233 and to an input 241 of quadrature filter, sample and hold circuit 236.

A reference capacitor 242 is connected across input 214 and output 231 of amplifier 215. Similarly, a reference capacitor 243 is connected across input 216 and output 234 of amplifier 217.

The analog circuitry shown in FIG. 4 interfaces with multiplexers 102A and 102B of totalizer system 100 by way of connections to multiplexers 102A and 102B from an output 244 of quadrature filter, sample and hold circuit 233 from an output 245 of quadrature filter, sample and hold circuit 241, and from an output 246 of peak detector 221.

In the embodiment shown in FIG. 4, wave generator 212 is a triangular wave generator typically providing a 20-volt peak-to-peak wave at a frequency of 10 kilohertz. Although triangular waves were used in this embodiment, other excitation signals, such as square waves or sine waves, may be used.

The operation of circuit 200A revolves in part around obtaining a null in the capacitive component of the excitation signal at input 214 of amplifier 215 and at input 216 of amplifier 217 when no fuel is present on fuel gage probes 25 or densisty sensor 26. The manner of obtaining this null can be understood by following the phase shifts through inverter 220 and across the capacitive loads between output 213 of wave generator 212 and inputs 214 and 216 of amplifiers 215 and 217, respectively.

After passing through the capacitive load of fuel gage probes 25 and density sensor 26, the excitation signal at inputs 214 and 216, respectively, is 90 degrees out of phase with the excitation signal at output 213. After passing through inverter 220, the excitation signal at output 225 of inverter 220 is 180 degrees out of phase with the excitation signal at output 213. After the signal at output 225 of inverter 220 has passed through capacitors 224 and 230, the excitation signal at inputs 214 and 216, respectively, are 270 degrees out of phase with the signal at output 213.

Therefore, the current at input 214 of amplifier 215 coming from fuel gage probes 25 is 180 degrees (270 degrees minus 90 degrees) out of phase with the current at input 214 coming from capacitor 224. Similarly, the current at amplifier input 216 coming from density sensor 26 is 180 degrees out of phase with the current coming from capacitor 230. With these current signals being 180 degrees out of phase at inputs 214 and 216, potentiometers 222 and 226, respectively, can be adjusted to provide a null when no fuel is present on fuel gage probes 25 or density sensor 26.

Bridge amplifiers 215 and 217 comprise a common base amplifier followed by an operational amplifier to provide the necessary gain. Since fuel gage probes 25 and density sensor 26 are high impedance sources, they can be treated as constant current sources. The low input impedance provided by the common base amplifier within amplifiers 215 and 216 is desirable to prevent loading effects from long lengths of shielded cable between fuel gage probes 25 and density sensor 26 and inputs 214 and 216, respectively.

The operational amplifier within amplifiers 215 and 217 provide the required DC feedback for bias stability with a low pass network. This results in high AC open loop gain. Outputs 231 and 234 of amplifiers 215 and 217 are respectively fed back through stable reference capacitors 242 and 243 to inputs 214 and 216, these inputs being at the common base stage of amplifiers 215 and 217. The resulting voltage output $E_{out}$ at outputs 231 and 234 may then be expressed by an equation as follows:

$$E_{out} = \frac{(E_{in})(C_A)}{C_{ref}}$$

In the above equation for amplifier 215, $E_{out}$ is the voltage at 231, $E_{in}$ is the excitation voltage at 214, and $C_{ref}$ is the capacitance of capacitor 242. For amplifier 217, $E_{out}$ is the voltage at 234, $E_{in}$ is the excitation voltage at 216, and $C_{ref}$ is the capacitance at capacitor 243. For both amplifiers 215 and 217, $C_A$ is the capacitance added by the fuel on the fuel gage probes 25 and density sensor 26, respectively.

Quadrature filter, sample and hold circuits 233 and 236 are employed as demodulators to reduce the quadrature current effects. In operation, a connection between output 237 of wave generator 212 and inputs 240 and 241 of circuits 233 and 236 transmits a square wave signal to circuits 233 and 236, respectively. This triggers the sample and hold function of circuits 233 and 236 at a point 90 degrees out of phase with the signal at output 213 of wave generator 212. In this manner, circuits 233 and 236 sample and hold the voltages at inputs 232 and 235, respectively, when the capacitive component of the sampled signal is at a peak and the resistive component of the signal is at a minimum. Circuits 233 and 236 thereby filter out the resistive component of the signal caused by contaminants, leaving only the capacitive component, thus providing a true measurement of the capacitance added by the fuel. These signals are held in absolute magnitude peak detectors at outputs 244 and 245 of circuits 233 and 236, respectively, for use by totalizer system 100.

Peak detector 221 provides a reference signal at output 246 indicating the amplitude of the excitation signal generated by wave generator 212. The amplitude of this reference signal is used during computational steps within microcomputers 104A and 104B to normalize the signal values provided at outputs 244 and 245.

Wave generator 212 may suitably comprise two LF157 operational amplifiers. Inverters 220 and peak detectors 221 may each comprise one LF157 operational amplifier. Amplifiers 215 and 217 may each comprise a 2N2222A transistor as a common base preamplifier driving an LF157 operational amplifier. Quadrature filter, sample and hold circuits 233 and 236 may each comprise an LF13202 switch, an LF157 operational amplifier, and a peak detector.

PRIMARY INDICATOR POWER SUPPLIES

In the embodiment shown in FIG. 4, primary indicator 200 receives three unregulated DC voltages from power supplies 106A and 106B in totalizer system 100. An unregulated plus eight volts DC is received at input 247, an unregulated plus eighteen volts DC is received at an input 250, and an unregulated minus 18 volts is received at an input 251. These voltages, which are diode "OR'd" from power supplies 106A and 106B (see FIG. 2), are then filtered and regulated to obtain respectively a plus five volts DC at an output 252, a plus 15 volts DC at an output 253, and a minus 15 volts DC at an output 254.

FUEL GAGE PROBES 25

Figure 5:
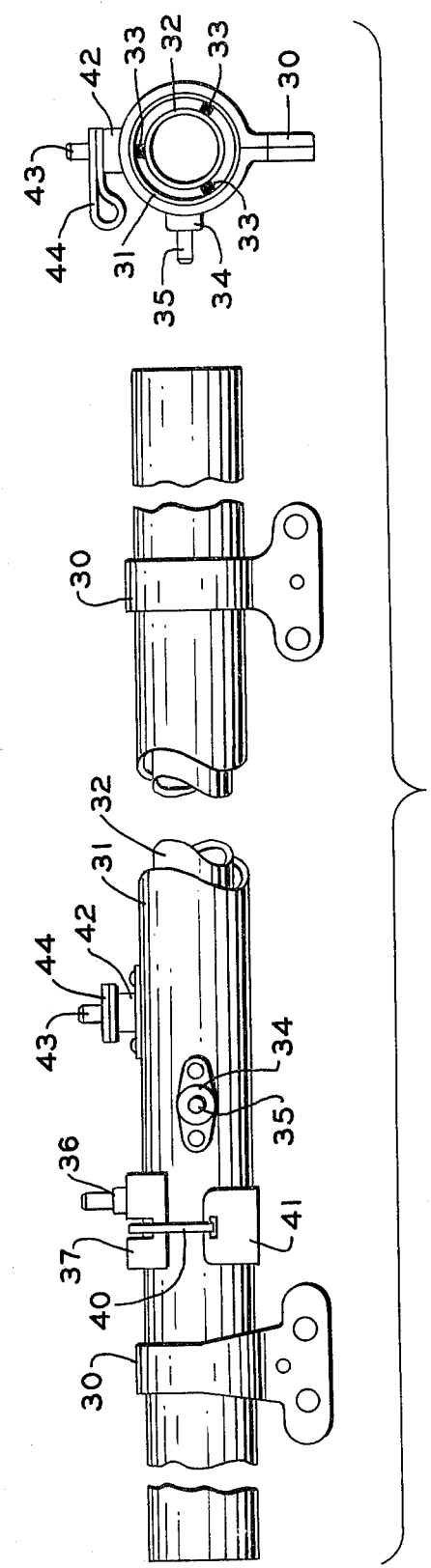
FIG. 5 depicts typical fuel gage probes compatible with the present invention.

A typical fuel gage probe characteristic of those used with the present invention is illustrated in FIG. 5. As will be immediately recognized by those skilled in the art, fuel gage probe 25 is physically noncharacterized in the sense that it is not physically configured to a shape characteristic of such factors as fuel tank shape. Instead, as is further explained elsewhere, tank volume computational data is stored in the memories of microcomputers 104A and 104B.

The number of fuel gage probes 25 required for each fuel tank is determined by a study of each individual fuel tank as well as other system and accuracy requirements. Within a typical aircraft system, each fuel gage probe 25 is substantially identical except for length.

A basic electrical signal for use with the present invention is the total wetted sensing length of the fuel gage probes 25 in each fuel tank. This signal is obtained from the combination of all fuel gage probes 25 within a fuel tank.

The total wetted sensing length of all fuel gage probes 25 within a fuel tank is a function of aircraft attitude, fuel tank shape and volume, fuel gage probe 25 locations, aircraft wing deflection, and either flight or ground conditions. For any set of conditions, total wetted sensing length versus fuel volume can be computed from data obtained from the aircraft manufacturer. This computation may be performed on a large scale, high precision computer such as the Honeywell H-6080 for a large number of attitudes and increments of fuel volume. This data may then be stored in tabular form in microcomputer memory within the microcomputers 104A and 104B and is used to compute actual fuel volume in each tank during operational conditions.

Accordingly, fuel quantity equations are computed by microcomputers 104A and 104B, and fuel gage probes 25 need only supply fuel level information and need not be physically characterized for individual output.

Each fuel gage probe 25 is a capacitor consisting of an outer electrode 31 and an inner electrode 32, each of which are typically fabricated of metallic tubing with a wall thickness on the order of 0.025 inch. Each electrode 31 and 32 is typically coated with an insulating material such as polyurethane varnish for corrosion resistance and electrical insulation. The outside diameter of the outer electrode is typically on the order of 1.175 inches. The minimum constant spacing between electrodes is typically 0.25 inch.

The concentricity between inner electrode 32 and outer electrode 31 is typically maintained by a number of sets of three Teflon spacers 33 which are positioned axially along each fuel gage probe 25. Teflon spacers 33, in addition to providing electrode concentricity, provide structural integrity necessary to support the inner electrode during vibration and shock. Teflon was selected as a typical satisfactory material for spacers 33 because of its ability to shed contaminants, thus minimizing electrical leakage between electrodes.

Fuel gage probes 25 are designed for internal mounting inside fuel tanks by such means as two mounting insulators 30 on outer electrode 31 together with mounting brackets or other means. Those skilled in the art will recognize that there are a number of means for mounting fuel gage probes 25 within aircraft fuel tanks.

Typical electrical connections to fuel gage probes 25 are made by means of stud-type terminals mounted to fuel gage probe 25. A first nut plate 34 is typically riveted to outer electrode 31 in order to provide a stud 35 to which a cable can be connected for electrical contact with outer electrode 31. Connection to inner electrode 32 may be made via a stud terminal 36 mounted in an insulating terminal block 37 secured on outer electrode 31 by way of a stainless steel strap 40 which also typically secures a nameplate 41. A second nut plate 42 is typically riveted to outer electrode 31 in order to provide a stud 43 for mounting a cable clamp 44 used as a strain relief for cables such as those running to stud 35 and stud terminal 36. Terminal block 37 is typically keyed into probe 25 in order to prevent rotation of terminal block 37 and to provide a means for locking inner electrode 32 to outer electrode 31, thereby preventing longitudinal sliding of inner electrode 32 within outer electrode 31.

Typically, high impedance inner electrode 32 is connected via stud 36 and cable to input 214 of amplifier 215 and low impedance outer electrode 31 is connected via stud terminal 35 and cable to output 213 of wave generator 212.

FUEL DENSITY SENSORS 26

As is further indicated in other portions of this specification, in order to have a system readout of fuel quantity in weight, such as pounds, as opposed to fuel quantity in volume, such as gallons, a measurement of fuel density is required. The fuel density may then be used with fuel volume to compute fuel weight. In order to determine fuel density, the dielectric constant of the fuel may be measured by a fuel density sensor 26. In conjunction with the analog circuitry within primary indicator 200, a system microcomputer (104A or 104B) may then compute a fuel density value using a relationship between dielectric constant and density as follows:

$$D = \frac{K - 1}{A + B(K - 1)}$$

where D is fuel density, K is fuel dielectric constant, and A and B are constant for a particular fuel type such as JP-4.

One density sensor 26 is installed in each fuel tank such that the density sensor 26 is completely covered by fuel when the system is in operation. All density sensors 26 may be identical. Any fuel density sensor measuring fuel dielectric known to those skilled in the art will be satisfactory for this purpose. In addition, of course, any other density sensor providing precision for the needs of a particular system may be used.

Density sensor 26 also provides a means to correct the fuel gage probe wetted sensing length measurement for variations due to changes in the dielectric constant of the fuel. This correction is made in the microcomputer using the measured fuel dielectric constant. As is obvious to those skilled in the art, the capacitance of the tank probes will change due to both the wetted length and the dielectric constant of the fuel in which the probes are immersed. By correcting for the measured dielectric constant, a more accurate measurement of the probe wetted length is obtained.

It will be understood by those skilled in the art that the functional interconnections depicted in and discussed with regard to FIGS. 1-5 are reprsentative of one or more electrical or other connections, as the case may be, and that other equipment or connections may be required to provide voltages and currents necessary to interconnect and operate the various devices.

SOFTWARE

Those skilled in the art will also understand that basic information theory derived from logical principles provides that all information no matter how complex can be represented by some collection of binary (yes or no) expressions. Within a microcomputer or other computer, such expressions are typically called "bits" and are typically stored in memory in the form of "logical highs" each representing a logical "1" (e.g. "yes") and "logical lows" each representing a logical "0" (e.g. "no"). Such "logical highs" and "logical lows" are typically stored in an apparatus comprising a predetermined array of gates or switches which are either opened or closed, an open switch typically resulting in a "logical low" (essentially 0 volts) in that location and a closed switch typically representing a "logical high" (e.g. 5 volts) in that location. Accordingly, those skilled in the art will further recognize that it is frequently difficult if not semantical to draw a demarcation between hardware and software since software can be permanently stored in a device such as a read only memory (ROM), thereby becoming a permanent portion of a microcomputer or other computer hardware.

For the purposes of this specification, however, certain portions of the present invention will be explained using the terminology "software" recognizing that, as indicated above, such "software" can and frequently is (or at least can be) converted to "hardware." Further, it should be recognized that, although a portion of the present invention may be described to include "software," it is possible to provide a completely hard-wired system.

Software related to the present invention can typically be described to consist of two distinct parts; the first being an operating executive, the second being data defining system and individual fuel tank parameters. The operating executive is best understood by first explaining the organization of the data.

DATA

Figure 6:
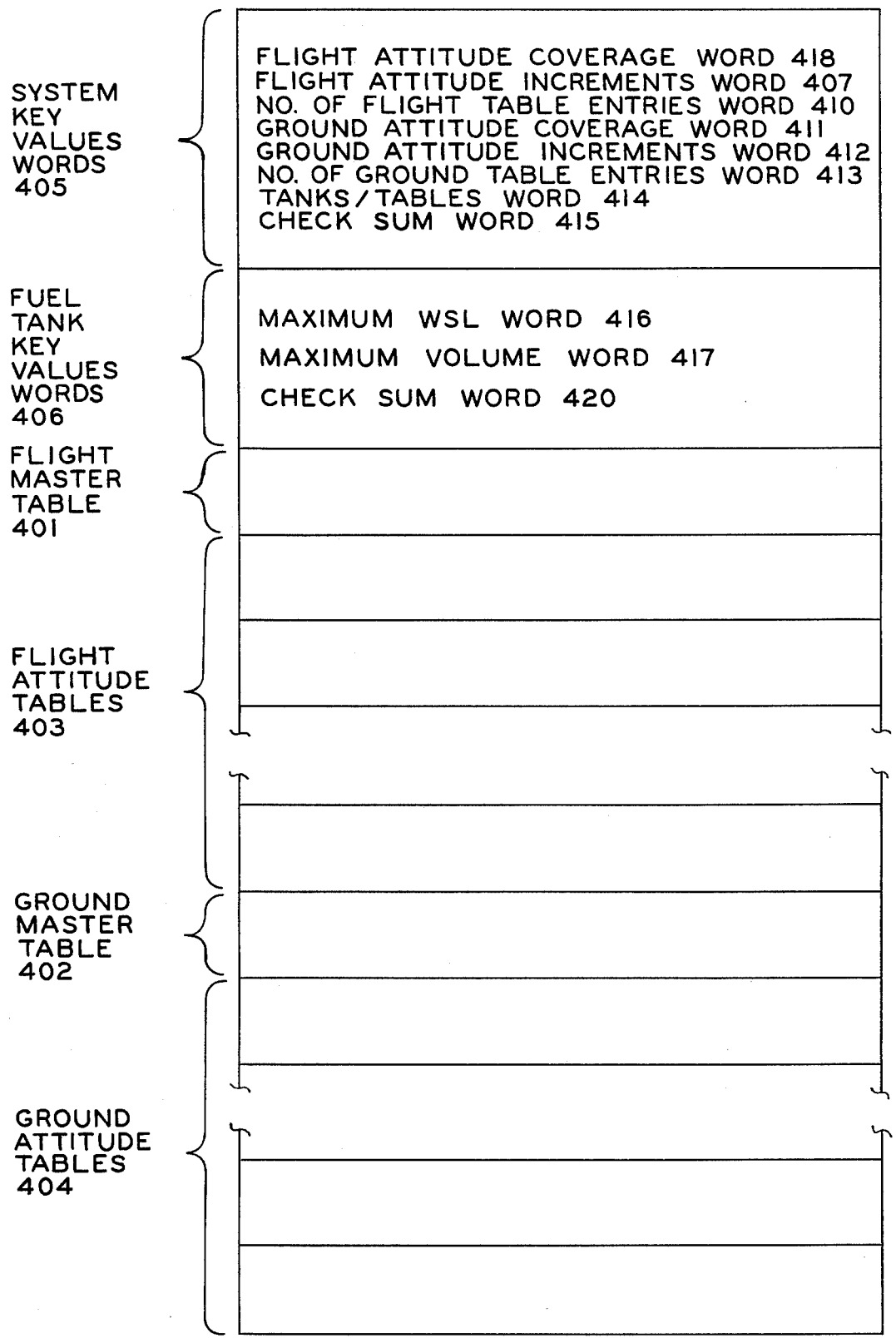
FIG. 6 is a typical memory map of stored data related to the present invention.

A typical memory map 400 of stored data related to the present invention is illustrated in FIG. 6. The format of memory map 400 describes the type and location of data within memory (e.g., the memories of microcomputers 104A and 104B) to the operating executive.

As it relates to an embodiment of the present invention as described herein, the majority of memory map 400 is devoted to attitude tables. Aircraft or fuel tank attitude together with characterization parameters such as fuel tank shape and volume, fuel gage probe 25 locations, wing deflection, and either flight or ground conditions determine how total wetted sensing length of fuel gage probes 25 in a particular tank relates to a particular volume of fuel in the tank. Thus, for any given set of conditions, total wetted sensing length versus fuel volume can be computed. This computation is typically performed on a large scale, high precision computer such as the Honeywell H-6080 for a large number of attitudes and increments of fuel volume. The data may then be permanently stored in read only memories (ROM's) such as within microcomputers 104A and 104B. The data is typically stored in the form of tables and is used to compute actual fuel volume or quantity in each tank for any measured set of conditions.

A particular aircraft or fuel tank attitude can be defined through one pitch measurement and one roll measurement. In the present invention, one attitude table is used for each of a predetermined number of attitudes. The number of attitude tables needed is a function of the range of pitch and roll coverage desired for a particular system. For example, a pitch range of plus or minus 10 degrees and a roll range of plus or minus 4 degrees for flight conditions and a pitch range of plus or minus 2 degrees and a roll range of plus or minus 2 degrees for ground conditions could be defined.

A computer analysis is typically used to determine the increments in which pitch and roll must be stored for sufficient accuracy. For the example previously discussed, computer analysis has indicated a worse case computation error of 0.5% results if both pitch and roll are stored in two-degree increments. For the range of pitch and roll just discussed above, this results in a flight matrix of 11 pitch attitudes by 5 roll attitudes and a ground matrix of 3 pitch attitudes by 3 roll attitudes.

Figure 7:
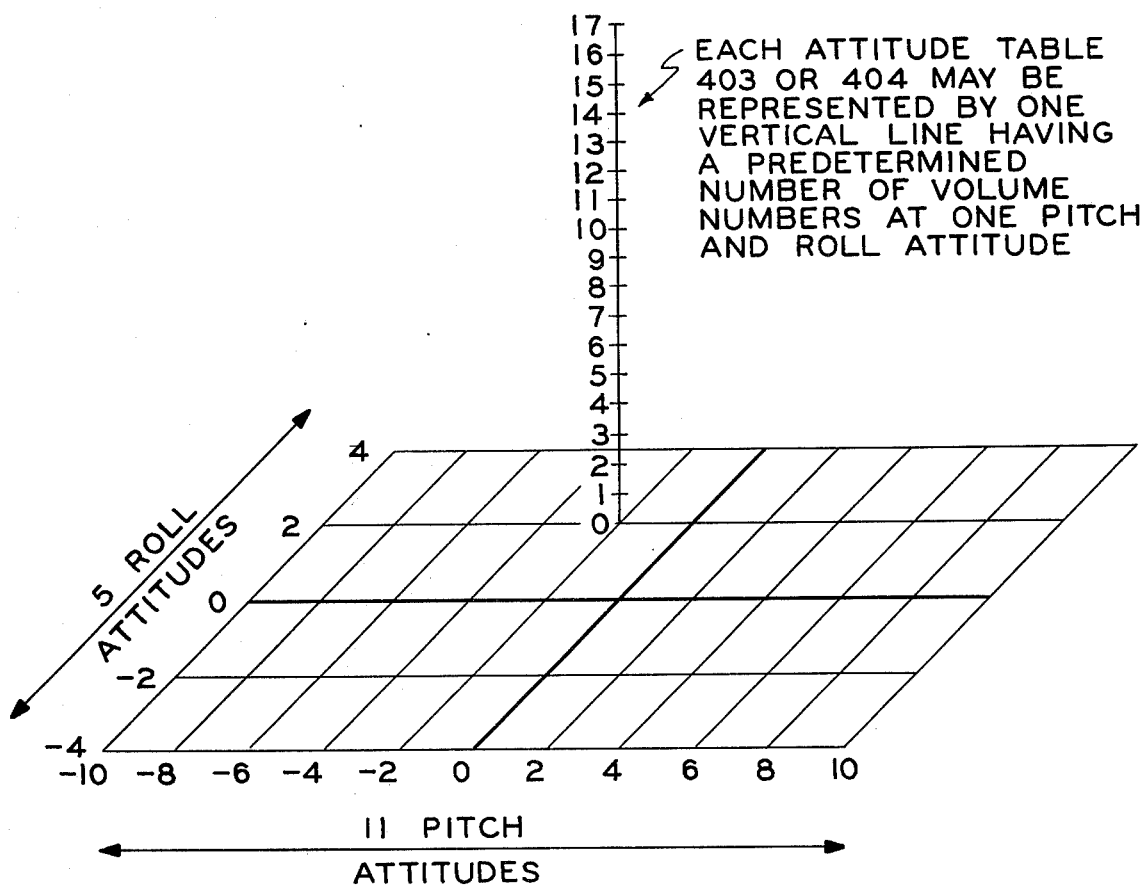
FIG. 7 depicts a flight matrix of 11 pitch attitudes by 5 roll attitudes drawn as a horizontal plane and a representation of an attitude table drawn as a vertical line and having a predetermined number of volumes.

By way of illustration, FIG. 7 depicts a flight matrix of 11 pitch attitudes by 5 roll attitudes drawn in a horizontal plane. Each attitude table may then be represented by one vertical line having a predetermined number of volumes. Thus, the flight matrix of 11 pitch attitudes by 5 roll attitudes illustrated in FIG. 7 represents a two-dimensional matrix, while volume numbers within each attitude table represent a third dimension.

Each volume number represents a change in wetted sensing length ($\Delta$WSL). The number of $\Delta$WSL's into which the total wetted sensing length of each fuel tank is divided is a function of system design and accuracy requirements. As an example, it might be determined that 17 $\Delta$WSL's might be adequate for each fuel tank within a system.

Since increments of wetted sensing length ($\Delta$WSL) are stored rather than total wetted sensing length, the second $\Delta$WSL entry when added to the first $\Delta$WSL entry corresponds to $WSL_2$, the total WSL at volume 2. Thus, $$WSL_2 = \Delta WSL_1 + \Delta WSL_2$$

An increment of wetted sensing length ($\Delta$WSL) is stored instead of total wetted sensing length for each volume number in order to increase resolution.

Therefore, total wetted sensing length $WSL_N$ corresponding to a particular volume number is equal to the summation of all applicable $\Delta$WSL's.

$$WSL_N = \sum_{i=1}^{N} \Delta WSL_i$$

In addition to attitude tables as discussed above, a master table with the same number of entries as the attitude tables is used in order to convert wetted sensing length to volume. Two master tables are used, a ground master table 402 and a flight master table 401. Again increments of volume ($\Delta$Volume) are stored so that $volume_1$ equals $\Delta volume_1$, but $volume_2$ equals $\Delta volume_1$ plus $\Delta volume_2$. Therefore, total volume $V_N$ is equal to a summation of all applicable $\Delta$volumes.

$$V_N = \sum_{i=1}^{N} \Delta Volume_i$$

One flight master table 401 is required for each fuel tank configuration for flight conditions and one ground master table 402 is required for each fuel tank configuration for ground conditions.

The number of attitude tables 403 or 404 required depends upon the range and increments of pitch and roll used. In the previously discussed example, there was a flight matrix of 11 pitch attitudes by 5 roll attitudes and a ground matrix of 3 pitch attitudes by 3 roll attitudes. Therefore, for each fuel tank configuration in that example, 55 flight attitude tables 403 are required (11×5=55 attitude combinations, there being one flight attitude table 403 for each attitude combination). Similarly, for each fuel tank configuration in the example, nine ground attitude tables 404 are required (3×3=9, there being one ground attitude table 404 for each combination).

As was previously noted for the above example, 17 increments of wetted sensing length ($\Delta$WSL's) were used for the total wetted sensing length in each fuel tank configuration. However, although 17 $\Delta$WSL's are required for computational purposes, the number of table entries in each attitude table 403 or 404 may be two less. Zero wetted sensing length (WSL) is assumed as 0 volume. Therefore, although the computation may use this value, it need not be stored in each attitude table 403 or 404. Similarly, maximum WSL is the same for all attitude tables 403 or 404 for any one fuel tank configuration. Memory storage is thus reduced by not storing maximum WSL as the last entry of each attitude table 403 and 404.

A similar process may be used for each flight master table 401 and ground master table 402, thus also reducing those tables to 15 entries or words each.

As previously indicated, zero wetted sensing length and zero volume need not be stored anywhere. Maximum wetted sensing length and maximum volume for each fuel tank configuration, however, are represented by particular numbers but can be stored using only two words of memory storage.

Since in the previously discussed example 66 tables are required for each fuel tank configuration (55 flight attitude tables 403, 9 ground attitude tables 404, 1 flight master table 401, and 1 ground master table 402), the amount of memory saved by the above process is 66 words minus 2 words or 64 words.

Therefore, with 15 entries or words per table, the total number of memory words required for table storage is 66 tables×15 words per table plus 2 words for storing maximum WSL and maximum volume or 992 words per fuel tank configuration.

It can be noted, however, that although 992 words of storage are required for each fuel tank configuration, a total of 1088 points are defined by these words; that is, the number of points defined by the previously discussed three-dimensional flight grid is 55 attitudes×17 volumes per attitude, or 935 points. For the ground grid, the number of points defined is 9 attitudes×17 volumes per attitude, or 153 points. Thus, 935 points+153 points yields 1088 points defined.

In addition to storage requirements for tables 401, 402, 403, and 404, storage is required for certain key values. Key values are those words required to completely define a table to the operating executive. There are two types of key values, system key values 405 and fuel tank key values 406. System key values 405 are typically stored only once, just before data for individual fuel tanks. Eight words are required for the storage of system key values 405. These are a flight attitude coverage word 418, a flight attitude increments word 407, a number of flight table entries word 410, a ground attitude coverage word 411, a ground attitude increments word 412, a number of ground table entries word 413, a tanks/tables word 414, and a check sum word 415.

Flight attitude coverage word 418 defines the number of degrees of pitch and roll covered by flight attitude tables 403. In the previously cited example, pitch coverage was stated to be plus or minus 10 degrees, and roll coverage was stated as plus or minus 4 degrees.

Flight attitude increments word 407 is composed of two parts. One part indicates the increments of pitch used (2 degrees in the previously cited example) in generating flight attitude tables 403, and the other indicates the increments of roll used (2 degrees in the previously cited example) in generating flight attitude tables 403. With this information, together with the pitch range and roll range information obtained from the flight attitude coverage word 418, the total number of flight attitude tables 403 can be calculated by the operating executive. Through such a calculation process, a particular flight attitude table 403 can be located.

The number of flight table entries word 410, together with the total number of data tables allows the operating executive to calculate the end of the data for each fuel tank configuration.

Ground attitude coverage word 411 defines the number of degrees of pitch and roll covered by ground attitude tables 404. In the previously cited example, ground attitude pitch coverage was plus or minus 2 degrees and ground attitude roll coverage was plus or minus 2 degrees.

As with flight attitude increments word 407, ground attitude increments word 412 is composed of two parts. One part indicates the increments of pitch (2 degrees in the previously cited example) used in generating ground attitude tables 404, and the other indicates the increments of roll (2 degrees in the previously cited example) used in generating ground attitude tables 404. With this information, together with the pitch range and roll range obtained from the ground attitude coverage word 411, the total number of ground attitude tables 404 can be calculated by the operating executive, thereby enabling the location of a particular ground attitude table 404.

The number of ground table entries word 413, together with the total number of data tables, allows the operating executive to calculate the end of the data for each fuel tank configuration. As with flight tables, the previously cited example included 15 entries in the ground tables.

Tanks/tables word 414 is also composed of two parts. The first part specifies the number of individual fuel tanks in the system. In the system illustrated in FIG. 1, there are four fuel tanks 21, 22, 23, and 24. The second part of tanks/tables word 414 specifies the number of sets of data tables stored in memory. In the case of the system illustrated in FIG. 1, fuel tank 21 is a mirror image of fuel tank 24, and fuel tank 22 is a mirror image of fuel tank 23. Because of this, for the system illustrated in FIG. 1, only two sets of tables need be stored; one set of tables for the configuration of fuel tanks 21 and 24 and one set of tables for the configuration of fuel tanks 22 and 23. In this manner, roll attitude polarity can simply be reversed for two corresponding tanks, thereby using the same table for both.

Check sum word 415 allows a memory sum check test to verify the validity of the other seven system key values 405. In such a sum check test, one may add all of the numbers comprising the other system key values words to get a sum which should equal a predetermined number if nothing has changed or been stored incorrectly.

In addition to key value words 405 required to completely define a table to the operating executive, three words are required for each fuel tank configuration to store fuel tank key values 406. These three words are a maximum wetted sensing length (WSL) word 416, a maximum volume word 417, and a check sum word 420.

Maximum WSL word 416, rather than actually being a maximum WSL, is an increment of WSL ($\Delta$WSL) which, when added with all $\Delta$WSL values in a predetermined table, yields the maximum WSL for a particular tank configuration. This approach is taken to increase the precision of calculations.

Using an approach similar to maximum WSL word 416, maximum volume word 417 is a $\Delta$Volume which, when added with all $\Delta$Volume values in a particular master table, yields the maximum volume for a particular fuel tank configuration. As with maximum WSL word 416, this approach is taken to improve calculation precision.

Check sum word 420 allows a memory sum check test to verify the validity of all data, including tables, stored for a particular fuel tank configuration.

As previously mentioned with regard to tanks/tables word 414, only two fuel tank configurations are present in the system illustrated in FIG. 1, thus requiring that only two sets of data tables be stored in the memories of microcomputers 104A and 104B. It was also previously mentioned that for the system illustrated 992 words (including maximum WSL word 416 and maximum volume word 417) are required for each tank configuration. Therefore, if check sum word 420 is included, each tank configuration requires 993 words of memory. Therefore, it can be seen that, with two sets of data tables and eight system key values 405, 1994 words are required for the system illustrated (993×2)+8=1994. Thus, a single 2K×8 read only memory (ROM) or programmable read only memory (PROM) is adequate for data storage.

OPERATING EXECUTIVE

As stated earlier, the operating executive is typically identified as one of two distinct parts of a software system, the other distinct part being data which has just been discussed.

Operating executive, which will now be discussed, causes all tasks to be performed when required. For example, it inputs all data, computes intermediate and final results, and controls displays.

The operating executive typically begins after power on by initializing the system. Initialization uses system key values 405 stored in the data table 400 portion of memory within microcomputers 104A and 104B. Using appropriate components of totalizer system 100 as previously described, pitch attitude values provided by pitch sensors 30A and 30B are read, roll attitude values provided by roll sensors 31A and 31B are read, and the three signal values corresponding to each fuel tank are read. These signal values are wetting sensing capacitance (WSC) provided by output 244 as a total wetted sensor length signal, fuel dielectric capacitance (K) provided by output 245 as the density sensor signal, and reference (REF) provided by output 246 representing the peak-to-peak magnitude of the excitation signal generated by wave generator 212.

These quantities are used in the following equations as follows:

WSL (Wetted Sensing Length)=(M) WSC/REF (Where M is a constant)

K' (Fuel Dielectric Constant)=(N) K/REF (Where N is a constant)

$$D \text{ (Density)} = \frac{K' - 1}{A + B(K' - 1)} \text{ (Where } A \text{ and } B \text{ are constants)}$$

The WSL value may also be corrected for the effect of fuel dielectric constant, as previously discussed, to obtain a more exact measurement. Also, density can be computed in other ways.

The values for WSL, pitch, and roll together with a signal from weight-on-wheel sensor 27 (which must also be read) are used to enter data tables for a particular fuel tank configuration and to determine fuel volume in a particular tank. Because pitch and roll are stored in increments (in 2-degree increments in the example discussed above), the process of determining fuel volume is one of a transformation since measured pitch ($P_M$) and measured roll ($R_M$) are unlikely to correspond exactly with values applicable to particular attitude tables 403 or 404. As an example, pitch attitudes $P_1$ and $P_2$ and roll attitudes $R_1$ and $R_2$ may be the closest tables to the measured pitch attitude $P_M$ and measured roll attitude $R_M$ such that:

$P_1 < P_M \leq P_2$ ($P_M$=measured pitch)

$R_1 < R_M \leq R_2$ ($R_M$=measured roll)

In such a case the four attitudes that bound $P_M$, $R_M$ are $P_1R_1$, $P_1R_2$, $P_2R_1$, and $P_2R_2$. These four attitude correspond to four attitude tables 403 or 404 stored in memory. One of these attitude tables is then searched to establish a $WSL_A$ and a $WSL_B$ where $WSL_A$ is above or equal to the measured value of wetted sensing length $WSL_M$ and $WSL_B$ is below $WSL_M$. Thus, $WSL_B < WSL_M \leq WSL_A$ ($WSL_M$=measured WSL)

A master table 401 or 402 is then entered to convert $WSL_A$ to $V_1$ and $WSL_B$ to $V_2$. $V_1$ and $V_2$ are volumes in attitude $P_1R_1$ that lie in the $WSL_A$ and $WSL_B$ planes (see FIG. 8).

The other three attitudes are then used to find three more volume points in the $WSL_A$ plane and three more volume points in the $WSL_B$ plane. Finding these volume points, however, involves interpolation since the $WSL_A$ chosen in $P_1R_1$ will probably not be stored in the other attitude tables. For example, in attitude $P_1R_2$, a $WSL_D$ and a $WSL_C$ (corresponding to a $V_D$ and $V_C$ respectively) may be stored instead of $WSL_A$, where:

$WSL_C < WSL_A \leq WSL_D$

A master table 401 or 402 is then used to convert $WSL_C$ and $WSL_D$ to $V_C$ and $V_D$ respectively. $V_3$ in $WSL_A$ can then be found using an equation as follows:

$$V_3 = V_C + (V_D - V_C) \frac{WSL_A - WSL_C}{WSL_D - WSL_C}$$

Likewise, $V_4$, a similar point in the $WSL_B$ plane, can be found for the corresponding attitude. This process is then repeated for the other two attitudes.

Volumes $V_1$ through $V_8$ are now known and describe a three-dimensional shape which completely encloses the measured wetted sensing length $WSL_M$ at the measured pitch $P_M$ and measured roll $R_M$. Volumes $V_1$, $V_3$, $V_5$, and $V_7$ lie in the $WSL_A$ plane. Using these volumes, their respective attitudes, and the $P_M$ and $R_M$ values, volume $V_A$ can be calculated. $V_A$ represents the projection of $WSL_M$, $P_M$, and $R_M$ on the $WSL_A$ plane. A similar point $V_B$ is then found on the $WSL_B$ plane.

$V_A$ and $V_B$ can now be used to compute the volume of fuel $V_F$ in the tank using an equation as follows:

$$V_F = V_B + (V_A - V_B) \frac{WSL_M - WSL_B}{WSL_A - WSL_B}$$

The density of the fuel D determined as previously described can then be used to calculate W weight of the fuel in the tank by multiplying fuel density D times fuel volume in the tank $V_F$. Thus,

W=(D)$V_F$

W for each fuel tank is then sent to the corresponding primary indicator 200 and repeater indicator 300 as well as being stored for use in computing total fuel weight $W_T$ on board the aircraft with an equation as follows:

$$W_T = \sum_{j=1}^{N} W_j$$

where N=number of fuel tanks in the system (e.g., N=4 for the system illustrated in FIG. 1).

Total fuel weight $W_T$ is then sent to digital readout 110 within totalizer indicator 107.

After each individual tank fuel weight W is computed and the total fuel weight $W_T$ is computed, a built-in test (BITE) sequence is run. On completion of the BITE sequence, the calculations for each tank and for total weight are repeated.

MODEL SOFTWARE LISTING AND FLOWCHART

Figure 9A:
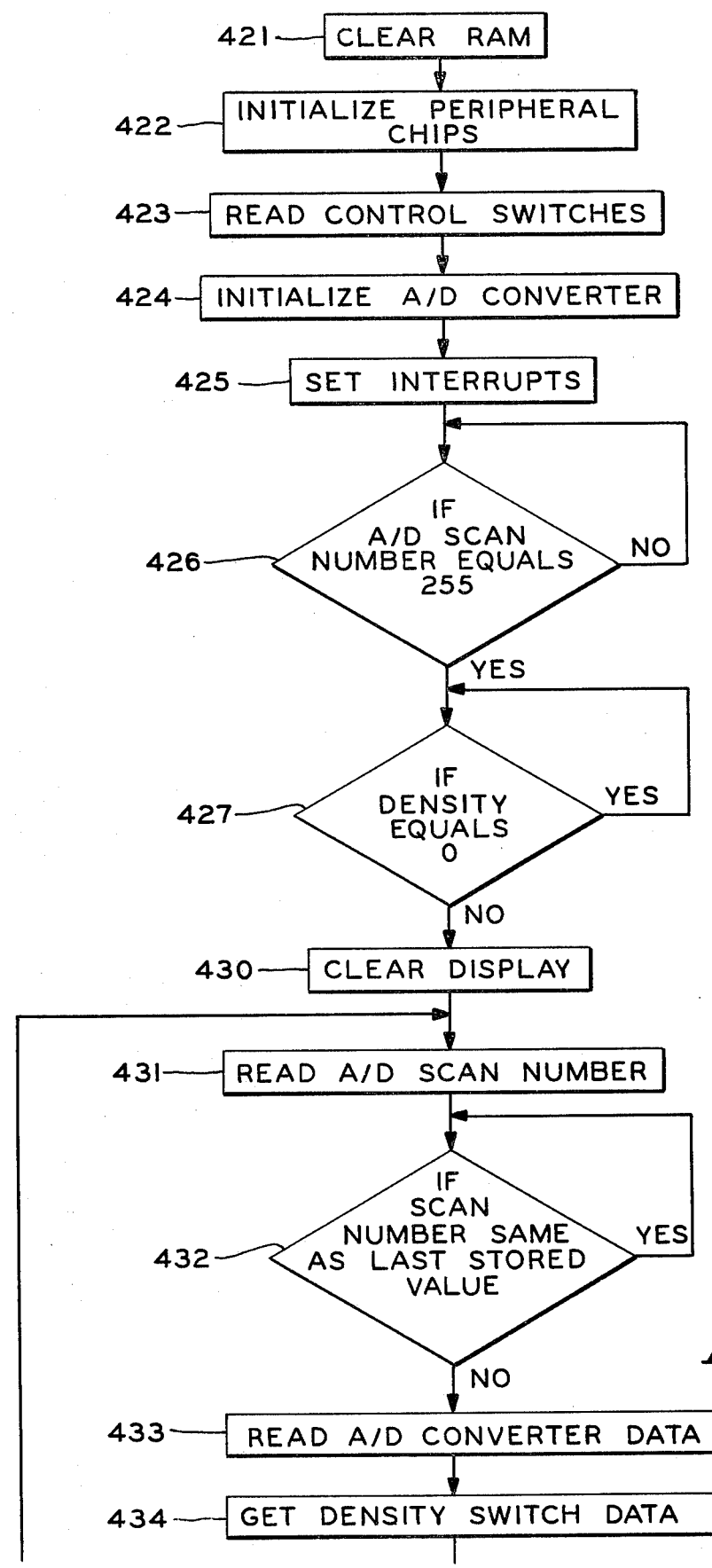
FIG. 9 (comprised of 9A-9C) is a flowchart of software used in a model of the present invention.
Figure 9B:
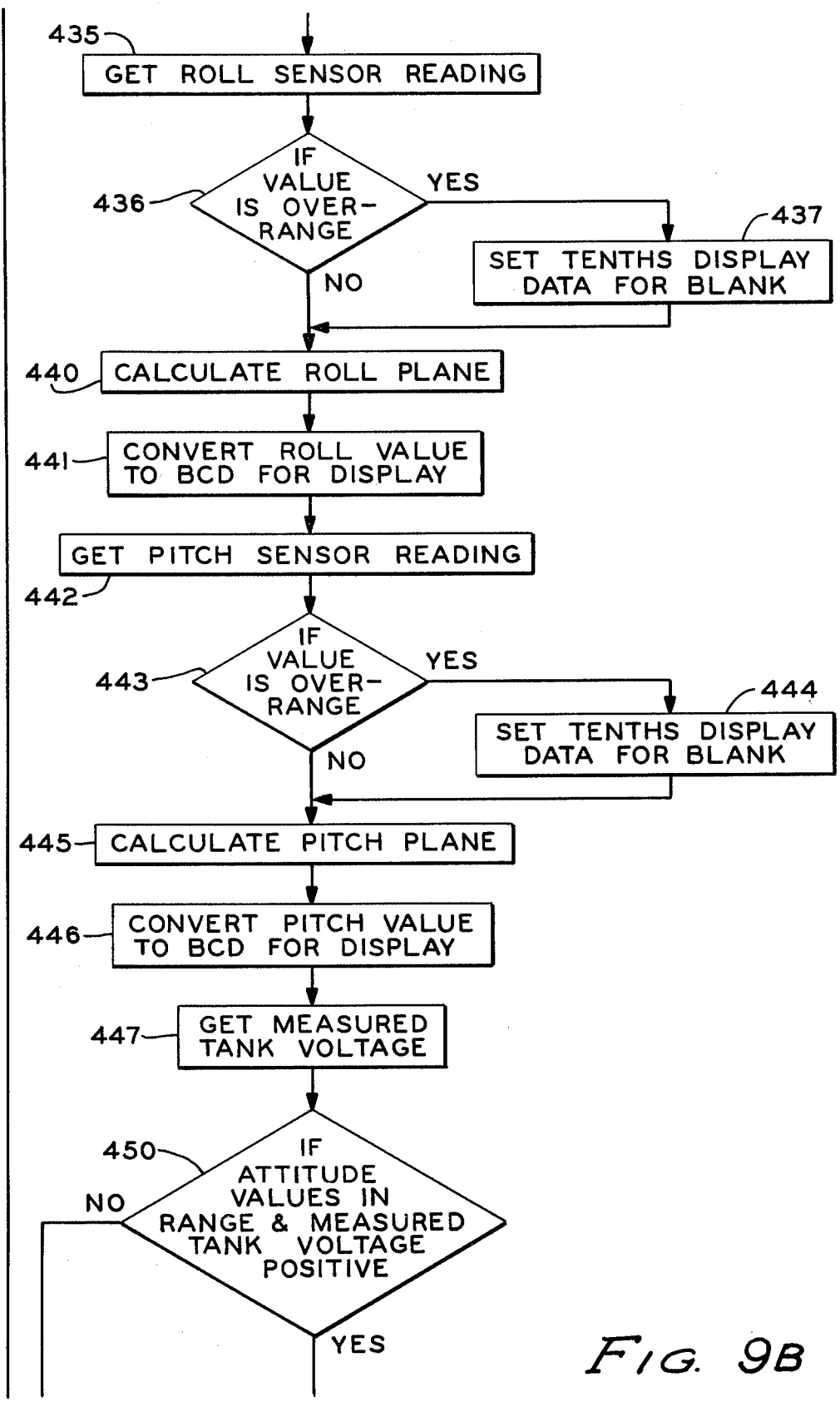
Figure 9C:
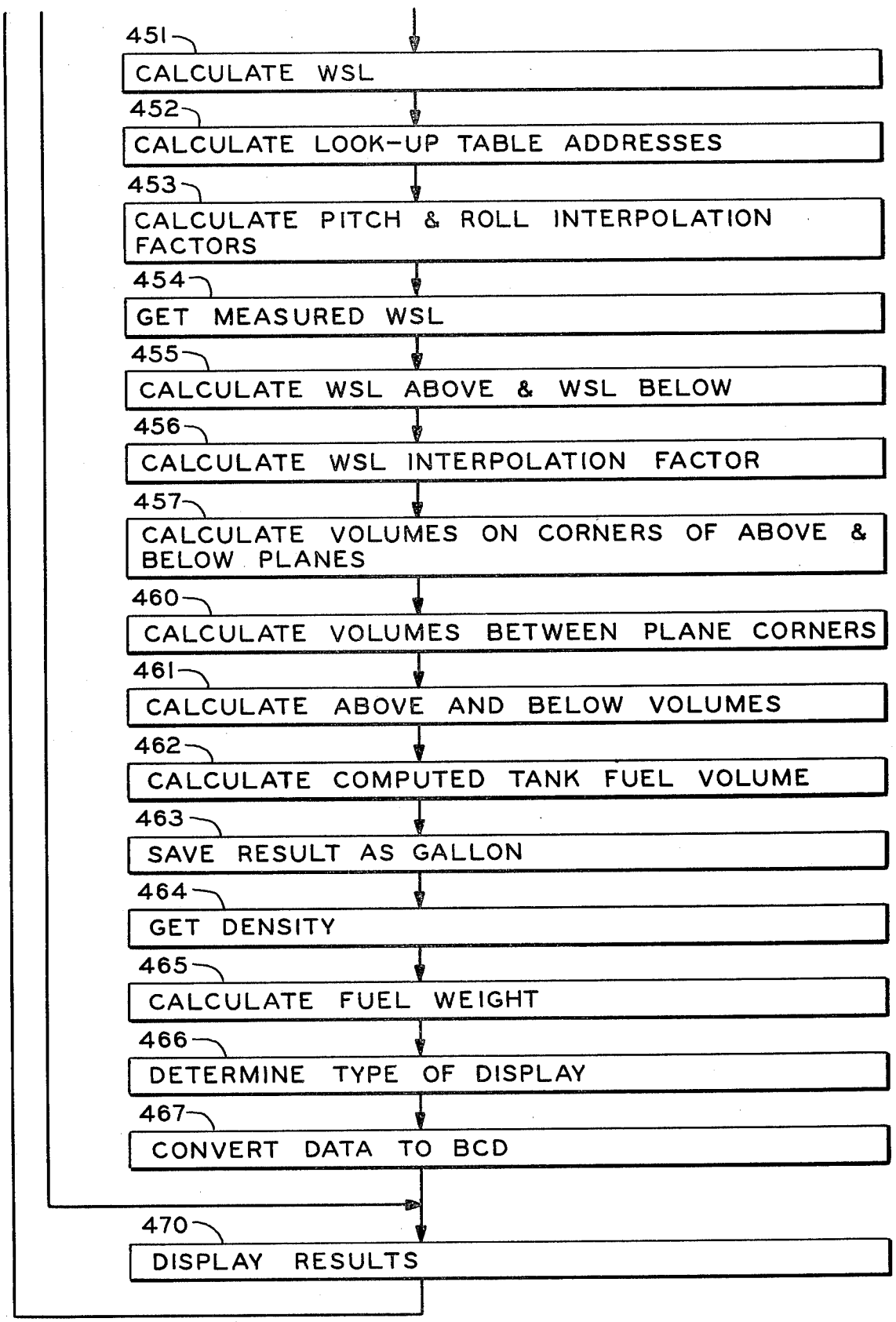

As was previously indicated, a model was built comprising a single channel of totalizer system 100. In addition to the components previously mentioned, that model also included a small fuel tank, two fuel gage probes 25, a pitch sensor (30A or 30B) and a roll sensor (31A or 31B) for measuring tank attitude, and means for moving the fuel tank about two axes in order to demonstrate that a digital readout of fuel volume or weight would remain substantially constant. The software for that model is disclosed in the attached Appendix A listing which is explained below with reference to the flowchart in FIGS. 9A, 9B, and 9C.

In block 421, the random access memory (RAM) is initialized by setting all locations to 0. This corresponds to lines 66-75 in program module INITL.

Two peripheral chips (an 8155 and an 8279) are initialized for proper system performance in block 422. 8155 is within the microcomputer of the model and contains a timer and input/output (I/O) ports. The 8279 was used in the model as the display and front panel computer interface and is analogous to display driver 105A or 105B shown in FIG. 2.

Initialization of the 8155 consists of setting the timer for no operation (so that the timer is not used) and setting the I/O ports as either inputs or outputs.

Initialization of the 8279 consists of setting a display interface for left entry 8-bit character display and a keyboard interface for encoded scan sensor matrix. The program clock is set to divide by 3, and display blanking is removed. The sensor matrix and display RAM are cleared and a code is issued to perform a lamp test. This corresponds to lines 80-105 and 171-176 in program module INITL.

The model included two control switches, one for selecting the type of display to be shown (gallons, pounds, or density) and the other to select a proper density range (high, low, or normal). As illustrated in block 423, the two control switches are read. Reading of the switches is performed in lines 109-113 in program module INITL and in all of program module CTLSTS.

Block 424 represents initialization of the A/D converter in the model. Initialization consists of programming the number of channels to be used and the amount of gain desired. The conversion is started, and the auto-increment, end-of-conversion interrupt, end-of-scan interrupt, and external clock options are selected. In addition, digital words are issued to D/A converters to provide exitation voltages for attitude sensors in the model. This process corresponds to lines 119-138 in program module INITL.

In block 425, a serial output data line is set to 0, and all interrupts are unmasked and enabled. This corresponds to lines 142-149 in program module INITL.

In block 426, a scan number is incremented at the end of each A/D conversion of all channels. This number is continuously monitored until it equals 255. Waiting for this time period allows the A/D converter to settle from any initial transients. This loop corresponds to lines 153-157 in program module INITL. The result of the A/D conversion is read and the scan number is incremented in program module ADCEOC.

Before initialization can be completed, a density value must be obtained as indicated in block 427. In the model, a button on the front panel initiated the density calculation. When the value becomes non-zero, a density value has been calculated, and the program continues. This loop corresponds to lines 158-162 in program module INITL. A density calculation is then made. This calculation is made in program module CALDEN.

In block 430, the display is cleared by outputting a proper code to the 8279. This is done in lines 164-165 of program module INITL. A jump is then made to the executive program module (EXEC). This module controls all further program operation.

In block 431, an A/D scan number is read. This corresponds to line 52 in program module NWDATA.

As represented by block 432, if the scan number read is the same as a previous number, no new data is available from the A/D converter. Therefore, a loop is used to wait until a new scan has been completed. This process is listed in lines 52-58 in program module NWDATA.

Block 433 illustrates that, after it has been determined that new data is available from the A/D converter, the data is read and stored in RAM. This process is listed in lines 60-71 of program module NWDATA.

It was previously indicated that a switch was available to select a density range of high, low, or normal. Through this switch, the density could be changed from a computed value by a factor of plus or minus 12.5%. The purpose of this selectable density readout was to illustrate the effect of density on computed fuel weight. The appropriate results are stored in RAM. This is done in program module HILOSW in block 434.

As shown in block 435, the roll sensor reading is next obtained from RAM. This occurs in line 52 of program module CALROL.

As shown in block 436, the roll sensor reading is next checked for an over-range condition. If the value is over-range (either plus or minus), display data is set to blank the least significant digit of the roll read-out display as indicated in block 437. This process is done in lines 53-65 and lines 110-113 of program module CALROL.

Figure 8:
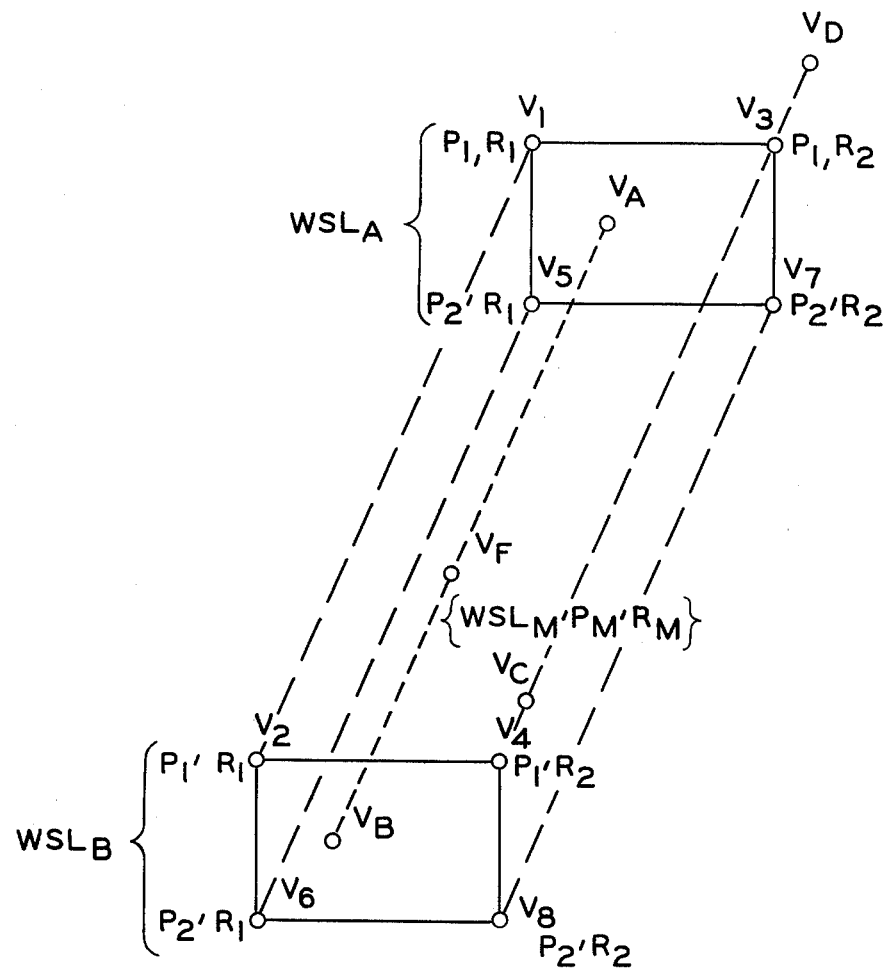
FIG. 8 is an illustration of volume transformation geometry used in computation of liquid volume in a tank.

Block 440 denotes calculation of a roll increment number corresponding to a roll plane just below the measured roll value $R_M$ (e.g., the plane established by the $R_1$ locations in FIG. 8) and a roll increment number corresponding to a roll plane just above the measured roll value $R_M$ (e.g., the plane established by the $R_2$ locations in FIG. 8). This process corresponds to lines 66-69 in program module CALROL.

As shown by block 441, the roll sensor reading is next converted from binary to BCD for display. This occurs in lines 90-109 in program module CALROL.

The pitch sensor reading is next obtained from RAM as shown in block 442. This occurs in line 52 of program module CALPIT.

In block 443, the pitch sensor reading is checked for an over-range condition. If the value is over-range (either plus or minus), display data is set to blank the least significant digit of the pitch read-out display as indicated in block 444. This process is done in lines 53-65 and lines 111-114 of program module CALPIT.

Block 445 designates calculation of a pitch increment number corresponding to a pitch plane just below the measured pitch value $P_M$ (e.g., the plane established by the $P_2$ locations in FIG. 8) and a pitch increment number corresponding to a pitch plane just above the measured pitch value $P_M$ (e.g., the plane established by the $P_1$ locations in FIG. 8). This process corresponds to lines 66-89 in program module CALPIT.

As shown in block 446, the pitch sensor reading is next converted from binary to BCD for display. This occurs in lines 90-110 in program module CALPIT.

A measured tank voltage is then read from its RAM location as illustrated in block 447. This is done in line 45 of program module CALWSL.

If values of attitude (pitch and roll) are over-range or the measured tank voltage is negative (implying negative WSL), all volume calculations are skipped as indicated by block 450. This determination is made in lines 46-48 of program module CALWSL, lines 33, 34, and 36 of program module EXEC, and in program module ARANGE.

As indicated by block 451, wetted sensing length (WSL) is next calculated using the measured wetted sensor length signal voltage. In this process, the measured wetted sensor length voltage WSC is multiplied by the ratio of an expected reference voltage M to the measured reference voltage REF. This is done to eliminate any variation in the measured reference voltage source (in FIG. 4, wave generator 212). This is done in lines 46-60 of program module CALWSL.

Table addresses are calculated next as indicated by block 452. Specifically, addresses to be used as starting points in the attitude lookup tables are calculated using the roll and pitch increment numbers calculated as indicated with regard to blocks 440 and 445 above. This corresponds to lines 81-127 of program module CALVOL.

As shown by block 453, pitch and roll interpolation factors are calculated using the roll and pitch increment numbers calculated as indicated for blocks 440 and 445. This is done in lines 128-151 of program module CALVOL and all of program module FACTOR.

A measured wetted sensing length (WSL) is next read from its RAM location as indicated by block 454. This occurs in line 154 of program module CALVOL.

Block 455 indicates calculation of the WSL above and the WSL below the measured WSL. This is done in lines 158-164 of program module CALVOL using program module WSLMAT.

A WSL interpolation factor is next calculated as indicated by block 456 using the above WSL, the below WSL, and the measured WSL. This is done in lines 165-167 of program module CALVOL.

As indicated by block 457, volumes are next computed at the corners of the planes above and below the measured WSL. $V_1$ ($V_E$ in software listing) and $V_2$ ($V_A$ in software listing) are not calculated because they are obtained directly from the data tables. Interpolation is necessary to calculate volume $V_3$, $V_4$, $V_5$, $V_6$, $V_7$, and $V_8$ ($V_G$, $V_C$, $V_F$, $V_B$, $V_H$, and $V_D$ in the software listing) at the other plane corners. This corresponds to lines 168-175 in program module CAVOL and to program modules WSLVOL and LETTER.

Using the volumes obtained as indicated with regard to block 457 and the attitude interpolation factors, volumes between the corners are next calculated as indicated in block 460. This is done in line 176 of program module CALVOL and in program module NUMBER.

Block 461 indicates calculation of above and below numbers $V_A$ and $V_B$ ($V_X$ and $V_U$ in the software listing) by using the volumes calculated as indicated with regard to block 460 and the attitude interpolation factors. This is done in line 177 of program module CALVOL using program module POINTS.

The tank fuel volume $V_F$ ($V_M$ in the software listing) is next calculated using the volumes obtained as indicated with regard to block 461 and the WSL interpolation factor. This process is indicated by block 462 and occurs in lines 178-186 of program module CALVOL.

As indicated by block 463, because the volume calculated is a percent of full scale volume, it is multiplied by the total tank volume to get actual fuel volume. This is done in lines 187-197 of program module CALVOL.

As indicated by block 464, the computed density is next read from RAM. This is done in line 38 of program module CALWGT.

Fuel weight is next calculated by multiplying volume times density. This step is indicated in block 465 and is done in lines 39-44 of program module CALWGT.

Using display select switch information, the quantity to be displayed is next determined, as indicated by block 466. The quantity can be either gallons, pounds, or density. This process occurs in lines 29-40 of program module DSPSEL.

As indicated by block 467, the data to be displayed is next converted from binary to BCD. This occurs in lines 41-61 of program module DSPSEL.

The display data is then outputted to the 8279 to be sent to the display. This is indicated by block 470 and occurs in program module DSPUPD.

The process then loops back to the executive entry point above box 431 and continues indefinitely.

The embodiments of the invention in which an exclusive property or right is claimed are defined as follows:

1. A liquid gaging system, comprising:
   a probe for mounting in a tank, the probe having a length, the probe for a particular tank producing a length signal dependent upon the portion of the probe being immersed in liquid;
   means for receiving an attitude signal related to an attitude of the tank;
   storage means for storing data related to tank shape, volume, and attitude and to probe location; and
   determining means for determining a value related to a liquid quantity in the particular tank based on the length signal, the attitude signal, and the data, the determining means being connected to the probe, the means for receiving, and the storage means.

2. A liquid gaging system, comprising:
   more than one probe for mounting in a tank, each probe having a length, each probe producing a length signal dependent upon the portion of the probe being immersed in liquid;
   means for receiving an attitude signal related to an attitude of the tank;

storage means for storing data related to tank shape, volume, and attitude and to location of the probes; and determining means for determining a value related to a liquid quantity in the particular tank based on the summed value of the length signals and the data, the determining means being connected to the probes, the means for receiving, and the storage means.

3. The apparatus of claim 1 wherein the probe comprises a capacitive probe having essentially uniform capacitance per unit length.

4. The apparatus of claim 3 wherein:

the storage means comprises a plurality of addressable memory locations, each location storing a predetermined portion of the data; and the determining means comprises means for using the attitude signal in locating a relevant storage means memory location address.

5. The apparatus of claim 4 wherein for each of a predetermined number of attitudes covered by the system, the storage means further comprises means for storing data comprising:

a set of flight wetted sensing length data corresponding to the tank;

a set of ground wetted sensing length data corresponding to the tank;

a set of flight volume data; and a set of ground volume data.

6. The apparatus of claim 3, 4, or 5 wherein:

the probe produces a length signal which is also dependent upon the dielectric constant of the liquid;

the apparatus further comprises a dielectric sensor for providing a capacitive signal related to the dielectric constant of the liquid; and the determining means comprises means for determining a value related to a liquid quantity wherein the value is also based on the capacitive signal, the determining means also being connected to the dielectric sensor.

7. The apparatus of claim 1 wherein:

the probe produces a length signal which is also dependent upon the dielectric constant of the liquid;

the apparatus further comprises a dielectric sensor for providing a capacitive signal related to the dielectric constant of the liquid; and the determining means comprises means for determining a value related to a liquid quantity wherein the value is also based on the capacitive signal, the determining means also being connected to the dielectric sensor.

8. The apparatus of claim 7 wherein the probe comprises a capacitive probe having essentially uniform capacitance per unit length.

9. The apparatus of claim 7 or 8 wherein:

the storage means comprises a plurality of addressable memory locations, each location storing a predetermined portion of the data; and the determining means comprises means for using the attitude signal in locating a relevant storage means memory location address.

10. The apparatus of claim 9 wherein for each of a predetermined number of attitudes covered by the system, the storage means further comprises means for storing data comprising:

a set flight wetted sensing length data corresponding to the tank;

a set of ground wetted sensing length data corresponding to the tank;

a set of flight volume data; and a set of ground volume data.

11. The apparatus of claim 1 wherein:

the storage means comprises a plurality of addressable memory locations, each location storing a predetermined portion of the data; and the determining means comprises means for using the attitude signal in locating a relevant storage means memory location address.

12. The apparatus of claim 11 wherein for each of a predetermined number of attitudes covered by the system, the storage means further comprises means for storing data comprising:

a set of flight wetted sensing length data corresponding to the tank;

a set of ground wetted sensing length data corresponding to the tank;

a set of flight volume data; and a set of ground volume data.

13. The apparatus of claim 12 wherein:

the probe produces a length signal which is also dependent upon the dielectric constant of the liquid;

the apparatus further comprises a dielectric sensor for providing a capacitive signal related to the dielectric constant of the liquid; and the determining means comprises means for determining a value related to a liquid quantity wherein the value is also based on the capacitive signal, the determining means also being connected to the dielectric sensor.

14. The apparatus of claim 11, 12, or 13 wherein the probe comprises a capacitive probe having essentially uniform capacitance per unit length.

15. The apparatus of claim 2 wherein each probe comprises a capacitive probe having essentially uniform capacitance per unit length.

16. The apparatus of claim 15 wherein:

the storage means comprises a plurality of addressable memory locations, each location storing a predetermined portion of the data; and the determining means comprises means for using the attitude signal in locating a relevant storage means memory location address.

17. The apparatus of claim 16 wherein for each of a predetermined number of attitudes covered by the system, the storage means further comprises means for storing data comprising:

a set of flight wetted sensing length data corresponding to the tank;

a set of ground wetted sensing length data corresponding to the tank;

a set of flight volume data; and a set of ground volume data.

18. The apparatus of claim 15, 16, or 17 wherein:

each probe produces a length signal which is also dependent upon the dielectric constant of the liquid;

the apparatus further comprises a dielectric sensor for providing a capacitive signal related to the dielectric constant of the liquid; and the determining means comprises means for determining a value related to a liquid quantity wherein the value is also based on the capacitive signal, the determining means also being connected to the dielectric sensor.

19. The apparatus of claim 2 wherein:

each probe produces a length signal which is also dependent upon the dielectric constant of the liquid;

the apparatus further comprises a dielectric sensor for providing a capacitive signal related to the dielectric constant of the liquid; and the determining means comprises means for determining a value related to a liquid quantity wherein the value is also based on the capacitive signal, the determining means also being connected to the dielectric sensor.

20. The apparatus of claim 19 wherein at least one of the probes comprises a capacitive probe having essentially uniform capacitance per unit length.

21. The apparatus of claim 19 or 20 wherein:

the storage means comprises a plurality of addressable memory locations, each location storing a predetermined portion of the data; and the determining means comprises means for using the attitude signal in locating a relevant storage means memory location address.

22. The apparatus of claim 21 wherein for each of a predetermined number of attitudes covered by the system, the storage means further comprises means for storing data comprising:

a set of flight wetted sensing length data corresponding to the tank;

a set of ground wetted sensing length data corresponding to the tank;

a set of flight volume data; and a set of ground volume data.

23. The apparatus of claim 2 wherein:

the storage means comprises a plurality of addressable memory locations, each location storing a predetermined portion of the data; and the determining means comprises means for using the attitude signal in locating a relevant storage means memory location address.

24. The apparatus of claim 23 wherein for each of a predetermined number of attitudes covered by the system, the storage means further comprises means for storing data comprising:

a set of flight wetted sensing length data corresponding to the tank;

a set of ground wetted sensing length data corresponding to the tank;

a set of flight volume data; and a set of ground volume data.

25. The apparatus of claim 24 wherein:

each probe produces a length signal which is also dependent upon the dielectric constant of the liquid;

the apparatus further comprises a dielectric sensor for providing a capacitive signal related to the dielectric constant of the liquid; and the determining means comprises means for determining a value related to a liquid quantity wherein the value is also based on the capacitive signal, the determining means also being connected to the dielectric sensor.

26. The apparatus of claim 23, 24, or 25 wherein at least one of the probes comprises a capacitive probe having essentially uniform capacitance per unit length.

27. A liquid gaging system comprising:

a sensor for providing a liquid measurement signal related to a liquid depth at a particular location in a tank;

means for receiving an attitude signal related to an attitude of the tank;

storage means for storing data related to tank shape, volume, and attitude and to sensor location; and determining means for determining a value related to a liquid quantity in the tank based on the liquid measurement signal, the attitude signal, and the data, the determining means being connected to the sensor, the means for receiving, and the storage means.

28. The apparatus of claim 27 wherein:

the storage means comprises a plurality of addressable memory locations, each location storing a predetermined portion of the data; and the determining means comprises means for using the attitude signal in locating a relevant storage means memory location address.

29. The apparatus of claim 28 wherein for each of a predetermined number of attitudes covered by the system, the storage means further comprises means for storing data comprising:

a set of flight wetted sensing length data corresponding to the tank;

a set of ground wetted sensing length data corresponding to the tank;

a set of flight volume data; and a set of ground volume data.

30. A liquid gaging system comprising:

a plurality of sensors, each sensor providing a liquid measurement signal relating to a liquid depth at a particular location in a tank;

means for receiving an attitude signal related to an attitude of the tank;

storage means for storing data related to tank shape, volume, and attitude and to location of sensors; and determining means for determining a value related to a liquid quantity in the particular tank based on the summed value of liquid measurement signals and the data, the determining means being connected to the sensors, the means for receiving, and the storage means.

31. The apparatus of claim 30 wherein:

the storage means comprises a plurality of addressable memory locations, each location storing a predetermined portion of the data; and the determining means comprises means for using the attitude signal in locating a relevant storage means memory location address.

32. The apparatus of claim 31 wherein for each of a predetermined number of attitudes covered by the system, the storage means further comprises means for storing data comprising:

a set of flight wetted sensing length data corresponding to the tank;

a set of ground wetted sensing length data corresponding to the tank;

a set of flight volume data; and a set of ground volume data.

* * * * *